US 6,453,392 B1

(12) United States Patent
Flynn, Jr.

(10) Patent No.: US 6,453,392 B1
(45) Date of Patent: Sep. 17, 2002

(54) METHOD OF AND APPARATUS FOR SHARING DEDICATED DEVICES BETWEEN VIRTUAL MACHINE GUESTS

(75) Inventor: John Thomas Flynn, Jr., Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/189,106

(22) Filed: Nov. 10, 1998

(51) Int. Cl.⁷ .............................................. G06F 12/00
(52) U.S. Cl. ................. 711/151; 711/1; 711/6; 711/117; 711/147; 711/151; 710/36; 710/38; 710/200; 710/201; 409/104
(58) Field of Search ............................. 711/1–2, 6, 117, 711/147, 151; 710/36, 38, 201, 200; 709/104

(56) References Cited

U.S. PATENT DOCUMENTS

| 4,207,609 A | | 6/1980 | Luiz et al. ..................... 710/38 |
| 4,396,984 A | * | 8/1983 | Videki, II ..................... 710/38 |
| 4,455,605 A | * | 6/1984 | Cormier et al. ............... 710/38 |
| 4,564,903 A | | 1/1986 | Guyette et al. ............. 710/201 |
| 4,843,541 A | | 6/1989 | Bean et al. .................... 710/36 |
| 5,109,489 A | | 4/1992 | Umeno et al. ................ 710/36 |
| 5,239,647 A | | 8/1993 | Anglin et al. ............... 707/205 |
| 5,257,379 A | | 10/1993 | Cwiakala et al. ............. 713/1 |
| 5,414,851 A | | 5/1995 | Brice, Jr. et al. ........... 714/104 |
| 5,426,748 A | * | 6/1995 | Brenza et al. ............... 711/203 |
| 5,471,609 A | | 11/1995 | Yudenfriend et al. .......... 714/4 |
| 5,555,385 A | | 9/1996 | Osisek .......................... 711/1 |
| 5,659,756 A | | 8/1997 | Hefferson et al. ........... 710/200 |

OTHER PUBLICATIONS

IBM Technical Disclosure Bulletin (TDB) vol. 32, No. 6B, Nov. 1989 "Generate Unique and Recoverable Object Identifier".
H. Umeno et al., "Methods for Consistency of Channel–Path–Reconnection with Direct I/O–Execution," *Transaction of the INformation Processing Society of Japan*, vol. 36, No. 5, pp. 1239–1252 May 1995.
D. Patterson et al., "a Case for Redundant Arrays of Inexpensive Disks (Raid)", proceedings of the 1988 ACM Signmond Conference in Management of Data, Chicao, IL Jun. 1988.

* cited by examiner

Primary Examiner—Do Hyun Yoo
Assistant Examiner—Mehdi Namazi
(74) Attorney, Agent, or Firm—Altera Law Group, LLC

(57) ABSTRACT

In a virtual machine (VM) environment, a virtual machine ID (VMID) uniquely associated with a preferred virtual guest (222) is sent to a storage controller (108) along with requests to RESERVE or RELEASE a direct access storage device (DASD) (128). The VMID is used by the storage controller (108) along with a path group ID (PGID) to determine the scope of the RESERVE or RELEASE. Thus, preferred virtual guests (216) of a single host processor (112) may share the DASD while both preserving data integrity and operating with the performance benefits of Input/Output (I/O) Assist. Sharing is similarly provided for tape devices with requests to ASSIGN or UNASSIGN.

21 Claims, 6 Drawing Sheets

METHOD OF AND APPARATUS FOR SHARING DEDICATED DEVICES BETWEEN VIRTUAL MACHINE GUESTS

BACKGROUND OF THE INVENTION

1. Field of the Invention

The present invention relates generally to the field of computer environments having virtual machines and storage systems.

2. Description of the Related Art

Virtual Machines. A virtual machine operating system running on a single host processor has the ability to create a plurality of virtual machines, each of which is an illusion of a real machine from a user's standpoint. Each vita machine is a simulation of a real computer system environment, where 'several different operating systems can be running in virtual machines concurrently. Each operating system running in a virtual machine may be referred to as a guest operating system or as a "guest".

One of the most widely used virtual operating systems is Virtual Machine Facility/Enterprise Systems Architecture (VM/ESA) provided by International Business Machines, Inc. VM manages an IBM System 390 computer and creates the illusion that each of several users operating from terminals with a complete System 390 computer. Several different guest operating systems are available for VM, including conversational systems (e.g., a Conversational Monitor System or CMS), multiple-access systems (e.g., VM/ESA), and batch or single users interactive systems (e.g., DOS/VSE).

A control program (CP) of VM running in the host processor manages the "real" resources (such as storage, processor, and input/output (I/O) resources) so that many independent and fully functional virtual machines appear to be doing their own processing using their own storage, processor, and I/O resources.

VM provides three types of virtual machines which are defined by their storage configurations: (1) a Virtual Real machine (V=R machine); (2) a Virtual=Fixed machine (V=F machine); and (3) a Virtual=Virtual machine (V=V machine). A V=R machine has a fixed, contiguous area of host real storage starting at "page" zero. CP does not page this storage, so guest real storage maps to host real storage. A V=F machine also has a fixed, contiguous area of host real storage, but the area does not start at real page zero. CP does not page this storage, and thus guest real storage maps to host real storage. Because V=R and V=F machines receive preference in terms of storage and performance, these virtual machines are called "preferred" virtual machines. A V=V machine has guest real storage that does not permanently map to host real storage. Rather CP pages the guest real storage of a V=V machine into and out of host real storage. Many V=R and V=F machines can be defined, but VM typically ensures some limitations—e.g. that you do not have more than one V=R machine and five V=F machines (or zero V=R machines and six V=F machines) logged on at the same time.

A host processor may operate in either supervisor state or in problem state. CP runs on the real machine in supervisor state, where it has access to all privileged instructions. When CP dispatches a particular virtual machine, that virtual machine runs on the real machine but in problem state. The virtual machine may be in either virtual supervisor state or virtual problem state. For each virtual machine, CP keeps a control block containing virtual registers and a virtual state word. The virtual state word indicates the current state of the virtual machine and the virtual instruction counter.

When CP dispatches a virtual machine, the virtual machine executes real instructions on the real machine. Many interrupts occur because a virtual machine attempts to execute a privileged instruction normally acceptable only by VM. Since virtual machines are constrained to run in the real machine's problem state, an interrupt results each time a virtual machine attempts a privileged instruction. Thus, program interruptions are the key to the interfacing between an executing virtual machine and CP.

When a virtual machine generates a program exception interrupt, CP gains control and determines the cause of the interrupt. If the virtual machine is executing in the virtual problem state, then CP passes the real program interruption directly to the virtual machine, which then processes the interrupt through its conventional interrupt-handling procedures. If, however, the virtual machine is operating in virtual supervisor state, then CP simulates the execution of the privileged instruction. To perform simulation, CP must determine what the virtual machine is attempting to accomplish. If I/O is being attempted, then CP performs any necessary mapping between virtual and real devices. If disk I/O is involved, then CP maps virtual track addresses to real track addresses. CP then schedules the real I/O operation corresponding to the a virtual I/O request, and returns control to the virtual machine's operating system, which then continues operation as if it itself had initiated the I/O. This CP interruption causes a loss of I/O performance for virtual machines.

A Virtual Machine Assist feature, which has both hardware and software components, is a performance improvement option available to VM installations. Virtual storage operating systems, such as Multiple Virtual Storage (MVS) systems, execute in problem state while under control of VM/ESA. Such operating systems use a large number of privileged instructions that generate interrupts requiring CP's attention and servicing. With the Virtual Machine Assist feature, however, the associated hardware intercepts and services many of these interrupts, resulting in significant performance benefits. With I/O Assist, also referred to as I/O Passthru or Start Interpretive Execution (SIE) Assist, significant I/O performance benefits are available.

In contrast with a basic mode associated with virtual partitioning, a host processor may alternatively operate in a logically partitioned (LPAR) mode. The LPAR mode provides partitioning of the processor across multiple physical or logical partitions. Each LPAR contains some portion of the processor and storage resources, some number of channel paths, and, if available, some portion of expanded storage. Since LPAR environments do not require CP translation or use, there are no I/O performance issues similar to those of VM. However, the flexibility of VM is lost with the use of LPARs.

Storage Systems. Many computer environments employ direct access storage device (DASD) subsystems for fast, efficient, and economical storage of data in a device which records and retrieves data in response to a reference of the data's location. The principle device which supports direct access storage is a disk.

Like other input/output (I/O) and storage devices, DASDs are often connected to a host processor through one or more channel paths. A channel retrieves channel commands from a channel subsystem in main storage of the host processor. A channel command word (CCW) sent from the host processor specifies the particular I/O command to be executed, the storage area associated with the operation, the action to be taken whenever transfer to or from the area is completed, and other options. One type of channel architecture is the Enterprise Systems Connection (ESCON) architecture, which is built around fiber optic transmission technology.

A channel forwards each command to a storage controller which governs operations of the DASDs. The storage controller provides a path for data transfer (as well as for command and status information transfer) between the host processors and the DASDs. It also converts the data from a form acceptable to the host processor to a form acceptable to the DASDs. The storage controller may be referred to as a control unit, a storage subsystem, a head of string, an integrated file adapter, an integrated storage control, a storage director, etc.

More particularly, a storage controller interprets and executes channel commands forwarded from. the host processor. For example, SEEK commands position a DASD access mechanism. SEARCH commands cause comparisons between data from main storage and data on specified areas of DASDs. WRITE commands cause data to be transferred from main storage to specified areas of DASDs. READ commands cause data to be transferred from DASDs to main storage and checked for validity. Thus, it is the channel commands that control the operations of the involved storage devices. Another function of the storage controller is to furnish status information to the host processor as the channel commands are executed. For example, the storage controller indicates when the transfer of a particular unit of data has been completed. In a READ operation, for example, the storage controller indicates when the end of the data file has been detected.

In some cases, the storage controller of a DASD is housed in the same physical unit as the DASD. In others, it is separate. In still others, the functions of the DASD are effected by two complementary units. In some cases, storage controller functions are performed by equipment that is housed within the same physical unit as the host processor. "Shared DASD" is typically used to describe the capability of accessing a DASD from two or more host processors. The accessing of a particular device is not concurrent or simultaneous by the host processors sharing it; rather, it is sequential. The sequence is determined by both hardware and software. A user installation may elect to allow data to be shared among host processors for any of several reasons. For example, scheduling of jobs is simplified and operator intervention is minimized. Instead of having to be moved from one system to another, a volume on a shared DASD can remain mounted and available to each system able to access it by means of the channel and/or string switch involved. As another example, the time and resources required to update data are minimized. When data must be added, deleted, or changed, only one update to a shared data set is needed. In contrast, multiple updates would be needed if each of several host processors had its own copy of the data set. In a multiple computer installation, backup and switch over to another computer when a hardware failure occurs is facilitated if the needed data is accessible to the other computer without having to move it. Finally, direct access storage space is saved. Only one copy of the shared data is required for current processing.

Sharing of a DASD between different host processors can be accomplished in any of several known ways. As examples, a two-channel switch may attach the storage controller to two channels on different processors; a four-channel switch may attach the storage controller to channels on different processors; and so on. When shared DASD capability is available, an 110 operation may be started to a shared device from any of the processors able to access the device. The processor must gain access to the device by means of a programmable switch. Each sharing processor vies for the switch to gain access into the pool of devices governed by the switch. The first requesting host processor gets the switch set to its interface. Then it can perform I/O operations to the device it addressed. When the switch returns to a neutral position, any other (or the same) can select another (or the same) device and have the switch set to its interface.

None of the sharing processors is generally aware of what other processors are doing with respect to data on the shared devices; data integrity is the responsibility of the using programs. To help insure data integrity, a RESERVE CCW can be issued to retain exclusive use of one or more of the shared devices while a data update is being performed. On the other hand, a RELEASE CCW can be issued to terminate the exclusive reservation. If a shared device has been. reserved for exclusive use, the channels through which the RESERVE CCW was issued will have access while the storage controller "locks out" any other channels attempting access.

To help provide the lockout mechanism for a RESERVE, each host processor generates a unique Path Group ID (PGID) and sends it to the storage controller through its group of channel paths upon initialization. The PGID allows the storage controller to distinguish which channel paths go to which host processors, and to associate the paths together into a logical grouping. When the RESERVE CCW is received, the storage controller uses the PGID to determine the scope of the RESERVE so that access to the storage device is blocked for all other hosts while the initiating host retains access through of all its channel paths.

Virtual Machines and Storage. A single DASD may be divided by CP into many minidisks, each of which may be allocated to a different virtual machine. Minidisks are subsets of full disks, and each consist of a range of cylinders. Each is treated by a virtual machine operating system as a complete physical disk device but one of smaller capacity than a full disk. CP handles the mapping of minidisks to real disks, but the space within each minidisk is managed by the operating system running on the virtual machine to which the minidisk is assigned.

In contrast to the sharing of minidisks, a single DASD may be shared between virtual guests where CP simulates the RESERVE and RELEASE for each guest requesting access. The storage controller still provides the lockout mechanism between different host processors using PGIDs, but CP distinguishes between its own virtual guests to provide the lockout mechanism therebetween. In order for CP to see and simulate the RESERVES, the I/O must be passed through CP's CCW translation routines. These translation routines account for a relatively large percentage of I/O processing time, and therefore virtual guests operate with reduced I/O performance when sharing a DASD in this manner. CP does not presently provide simulation of ASSIGN and UNASSIGN for tape devices, which prevents more than one guest from sharing a tape device in this manner.

Alternatively, a DASD which is "dedicated" is owned by a single virtual machine and not shared with other guests. The host processor may support a SIE instruction which allows for one or more preferred virtual guests to operate advantageously using I/O Assist. The SIE instruction puts a preferred virtual guest in complete control of hardware to which it has access, without undue processing by CP and thus better I/O performance. However, since the PGID is established by CP and is the same for all virtual guests of the same host processor, the storage controller cannot distinguish between different guests accessing storage using I/O Assist. Thus, sharing of a DASD is not presently available nor possible between preferred virtual guests of the same host processor under I/O Assist without compromising data integrity.

Accordingly, there is a need for an alternative to conventional virtual machine environments that do not accommodate the sharing of dedicated devices between virtual machine guests of the same host processor.

SUMMARY OF THE INVENTION

In a virtual machine environment, a virtual machine ID associated with a virtual machine is sent to a storage controller along with a request to access a storage device. The virtual machine ID is used by the storage controller along with a path group ID to determine the scope of the access request. Thus, virtual machines of a single host processor may share the storage device while both preserving data integrity and performing optimally.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein.

DETAILED DESCRIPTION OF THE PREFERRED EMBODIMENTS

Figure 1:
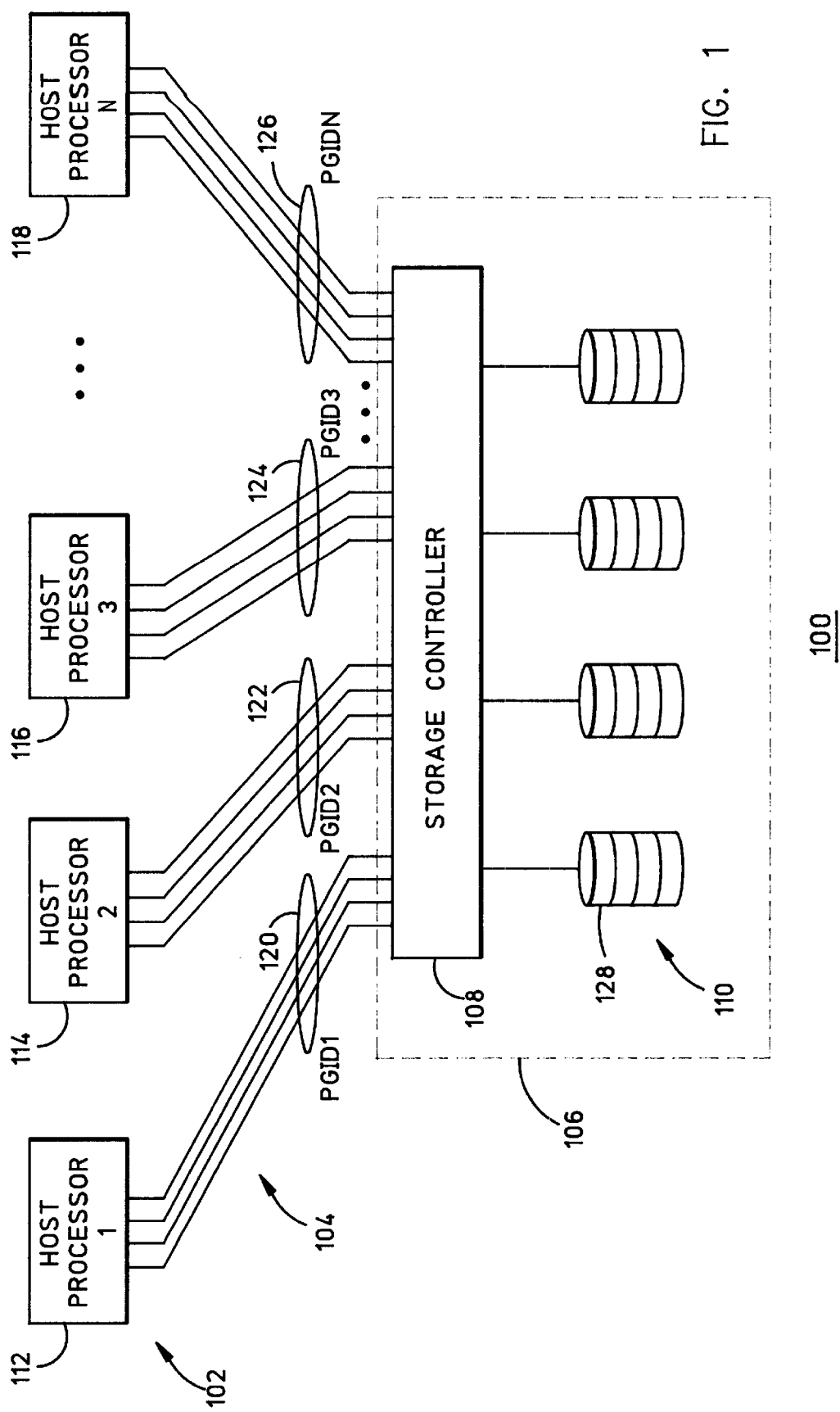
FIG. 1 is a block diagram of a computer system which includes a plurality of host processors and a storage system.

FIG. 1 is an illustration of a computer system 100, which will be shown and described to embody a virtual machine environment. Computer system 100 includes a plurality of host processors 102 coupled to a storage system 106 through a plurality of channel path groups 104. The plurality of host processors 102 may include any number of host processors up to the limitations of the system. The plurality of host processors 102 shown include host processors 112, 114, 116, and 118, designated as host processors 1, 2, 3, . . . , N, respectively. Some of the plurality of host processors 102, for example, may be part of a computer such as a desktop computer. Each of the plurality of host processors 102 may comprise any suitable processor, such as an IBM System 390 processor provided by International Business Machines (IBM).

Storage system 106 includes a storage controller 108 and a plurality of storage devices 110, such as a storage device 128. The plurality of storage devices 110 may include any suitable storage devices, such as direct access storage devices (DASDs) and/or tape devices. Storage controller 108 may include suitable types of hardware and software used in conventional storage controllers. For example, storage controller 108 typically includes a processor having software to perform several required functions, conventional as well as novel functions described herein.

Each of the plurality of host processors 102 communicates with storage controller 108 through one of the plurality of channel path groups 104. For example, host processor 112 communicates with storage controller 108 through a channel path group 120. Similarly, host processors 114, 116, and 118 communicate through channel path groups 122, 124, and 126, respectively. Each of the plurality of channel path groups 104 include a plurality of channel paths.

Each of the plurality of channel path groups 104 has a unique Path Group ID (PGID) associated therewith. The PGIDs shown include PGID1, PGID 2, PGID3, . . . , PGIDN associated with host processors 112, 114, 116, and 118, respectively.

Storage controller 108 is operative to provide multiple exposure access to each of the plurality of storage devices 110. That is, a single storage device (e.g., a disk) may be accessed at a number of different addresses or exposures. For example, storage controller 108 may allow storage device 128 to be accessed at Base Address$_1$, Alias Address$_{1A}$, and Alias Address$_{1B}$, and allow another storage device to be accessed at Base Address$_2$, Alias Address$_{2A}$, and Alias Address$_{2B}$.

Preferably, storage system 106 incorporates Redundant Array of Independent Disks (RAID) architecture. The concepts and variations of RAID technology area well known in the field of storage. The levels of RAID are described, for example, in Patterson et al., "A Case for Redundant Arrays of Inexpensive Disks (RAID)", proceedings of the 1988 ACM SIGNMOND Conference on Management of Data, Chicago, Ill., June 1988.

Figure 2:
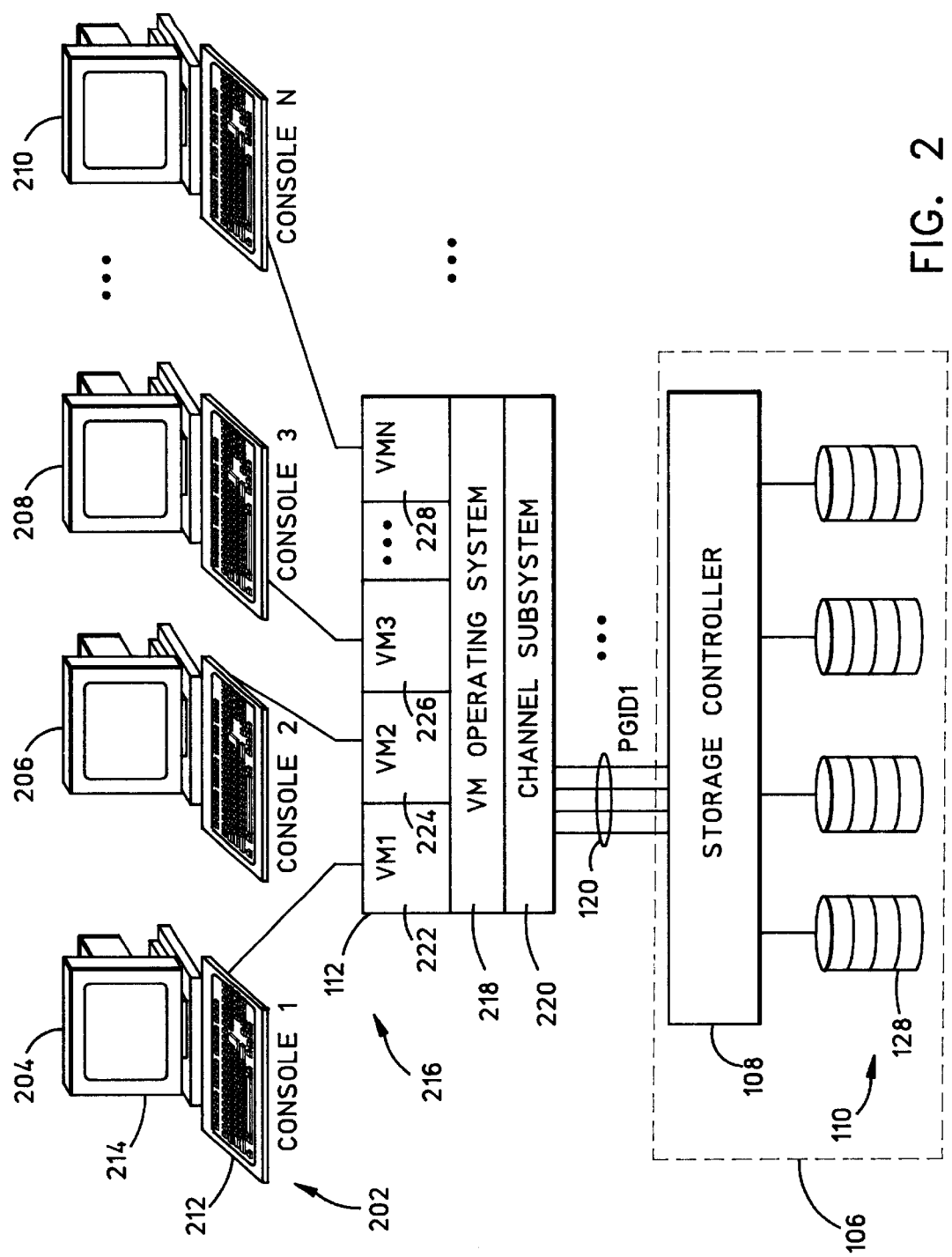
FIG. 2 is an illustration of the computer system of FIG. 1, showing more particularly a host processor having a plurality of virtual machines.

FIG. 2 is an illustration of part of computer system 100 of FIG. 1, showing more detail with respect to host processor 112. Host processor 112 may be representative of other host processors of computer system 100 of FIG. 1. Host processor 112 is coupled to a plurality of user consoles 202. The plurality of user consoles 202 may include any number of consoles up to the limitations of the system. The plurality of user consoles 202 shown include user consoles 204, 206, 208, and 210, designated as CONSOLE1, CONSOLE2, CONSOLE3, . . . , CONSOLEN, respectively. Each of the plurality of user consoles 202 may include a visual display monitor and an input device (e.g., a keyboard), such as a visual display monitor 214 and an input device 212 shown with respect to user console 204.

As in many processors, host processor 112 has a central processing unit (CPU) and a memory. The CPU executes a virtual machine operating system 218 stored in the memory. Virtual machine operating system 218 includes a control program (CP) and is executable to create a plurality of virtual machines 216. The plurality of virtual machines 216 may include any number of virtual machines up to the limitations of the system. Virtual machine operating system 218 may be Virtual Machine Facility/Enterprise System Architecture (VM/ESA), as described above, with modifications described herein.

The plurality of virtual machines 216 shown include virtual machines 222, 224, 226, and 228, designated as VM1, VM2, VM3, . . . , VMN, respectively. Each of the plurality of virtual machines 216 has a virtual processor and storage for executing an operating system. These guest operating systems may comprise any compatible operating system, for example, a multiple virtual storage (MVS) operating system or a conversational monitor system (CMS). In the embodiment described, virtual machines 222, 224, and 226 are preferred virtual machines.

Host processor 112 supports an interpretive-execution (IE) facility. A control program (CP) of virtual machine operating system 218 depends on the IE facility to process work for virtual machines. A virtual machine currently running under the control of the IE facility is said to be running in an interpretive-execution mode. When the virtual machine runs in the IE mode, the IE facility handles many functions. For example, the IE facility handles most privileged and non privileged instructions; handles the virtual interval time, the clock comparator, and the processor timer; and translates and applies prefixing to storage addresses. The IE facility supports several "assists" to improve virtual machine performance, including I/O Assist. Using machine assists, the most frequent I/O instructions for devices dedicated to a preferred virtual machine need no CP processing, and most I/O interruptions are directly reflected to the preferred virtual machine.

Figure 3:
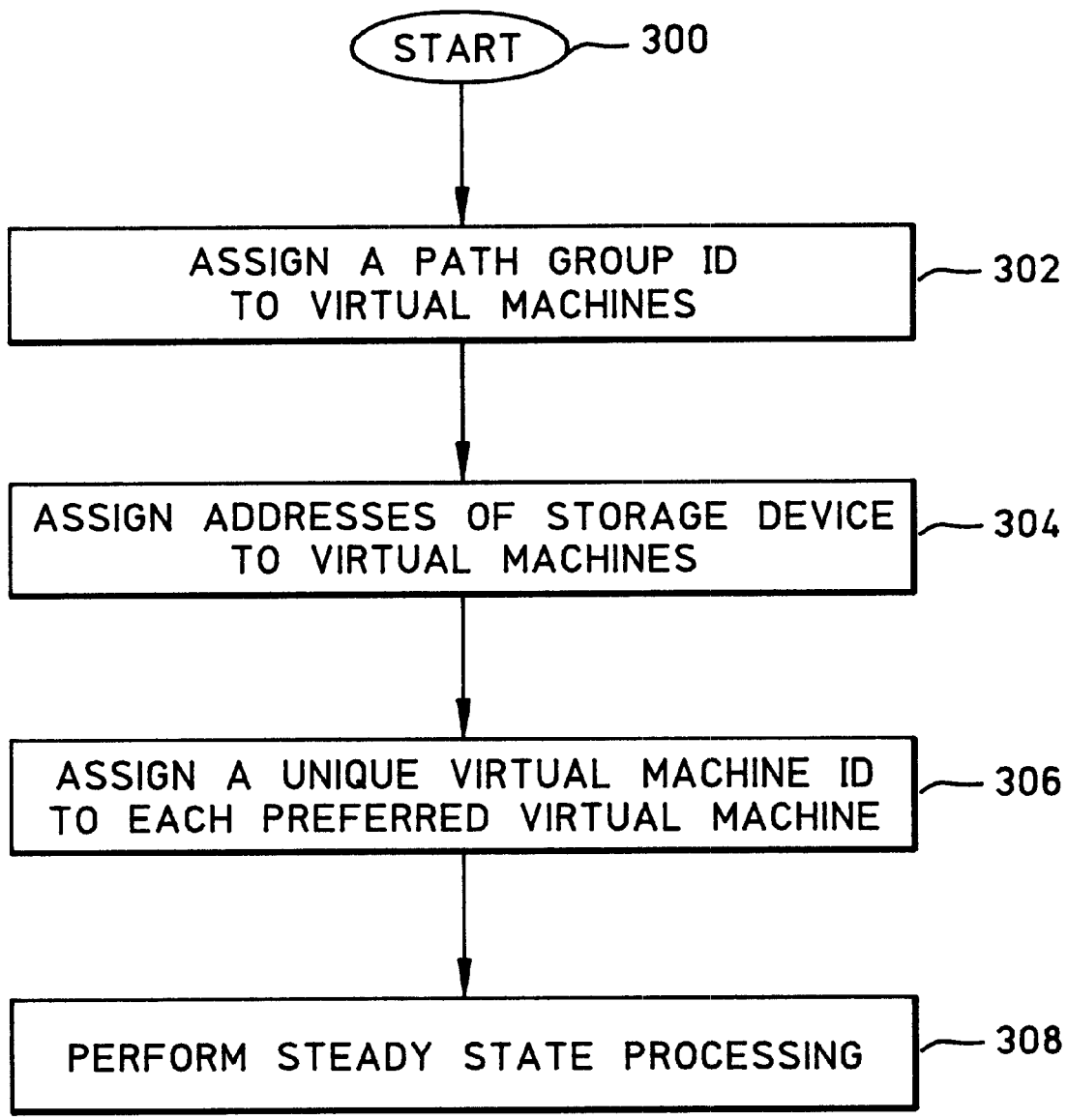
FIG. 3 is a first flowchart describing a method of sharing dedicated devices between virtual machine guests of a host processor.
Figure 4:
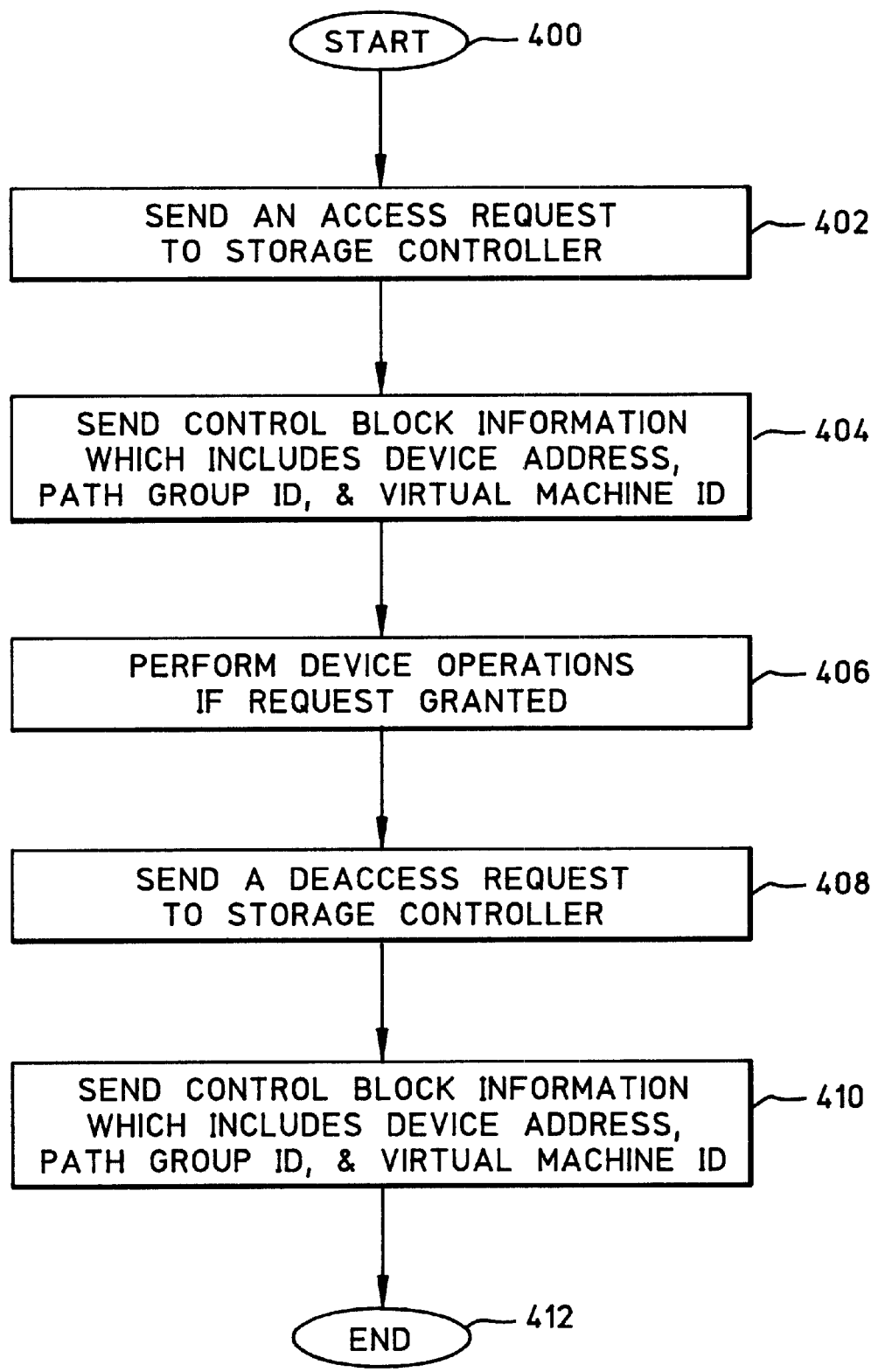
FIG. 4 is a second flowchart describing the method of sharing dedicated devices between the virtual machine guests.
Figure 5:
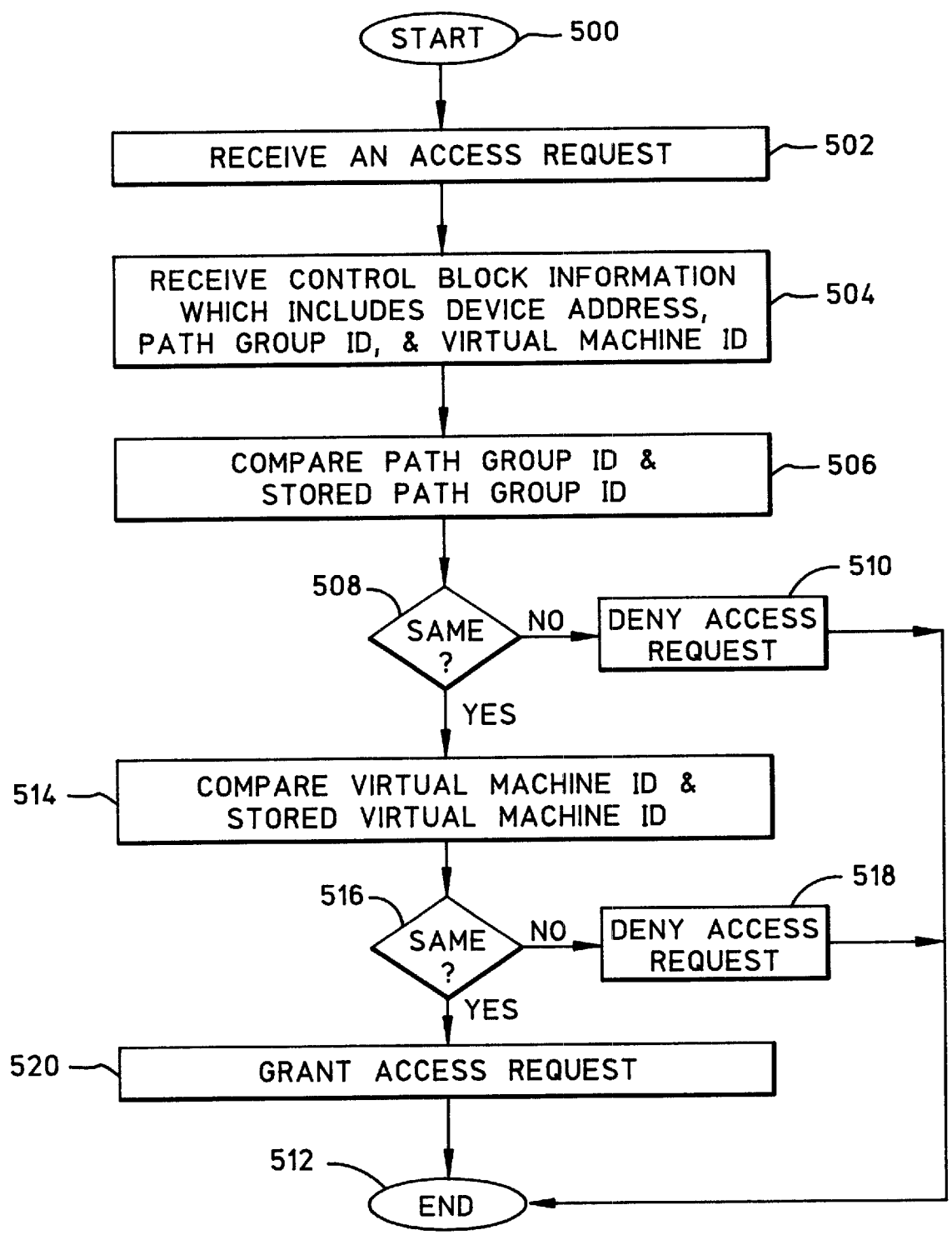
FIG. 5 is a third flowchart describing the method of sharing dedicated devices between the virtual machine guests.

FIGS. 3–5 are flowcharts describing a method of sharing dedicated devices between virtual machine guests. To begin, virtual machine operating system 218 of FIG. 2 performs conventional initialization. An initial program loading (IPL) provides a means for causing a program to be read from a designated device and for initiating execution of that program. A start interpretive-execution (SIE) instruction is used to run the virtual processors. A parameter list describing the environment of a preferred guest is generated by CP when the preferred guest is dispatched under the SIE instruction. Each parameter list proscribes, for example, which storage device or devices an associated preferred guest is allowed to access. Each parameter list is stored in a control block of an associated preferred guest.

Reference will be made to FIGS. 2 and 3 in combination. As in conventional systems, virtual machine operating system 218 generates and assigns the PGID associated with virtual machines 222, 224, and 226 (step 302). Next, virtual machine operating system 218 assigns one of a plurality of addresses of storage device 128 to each of virtual machines 222, 224, and 226 (step 304). Each address is stored in a respective control block of virtual machines 222, 224, and 226. For example, virtual machine operating system 218 assigns a Base Address, of storage device 128 to virtual machine 222, an Alias Address$_{1A}$ of storage device 128 to virtual machine 224, and an Alias Address$_{1B}$ of storage device 128 to virtual machine 226. Virtual machine operating system 218 also assigns a Base Address$_2$ of another storage device to virtual machine 222, an Alias Address$_{2A}$ of the other storage device to virtual machine 224, and an Alias Address$_{2B}$ of the other storage device to virtual machine 226, etc.

Figure 6:
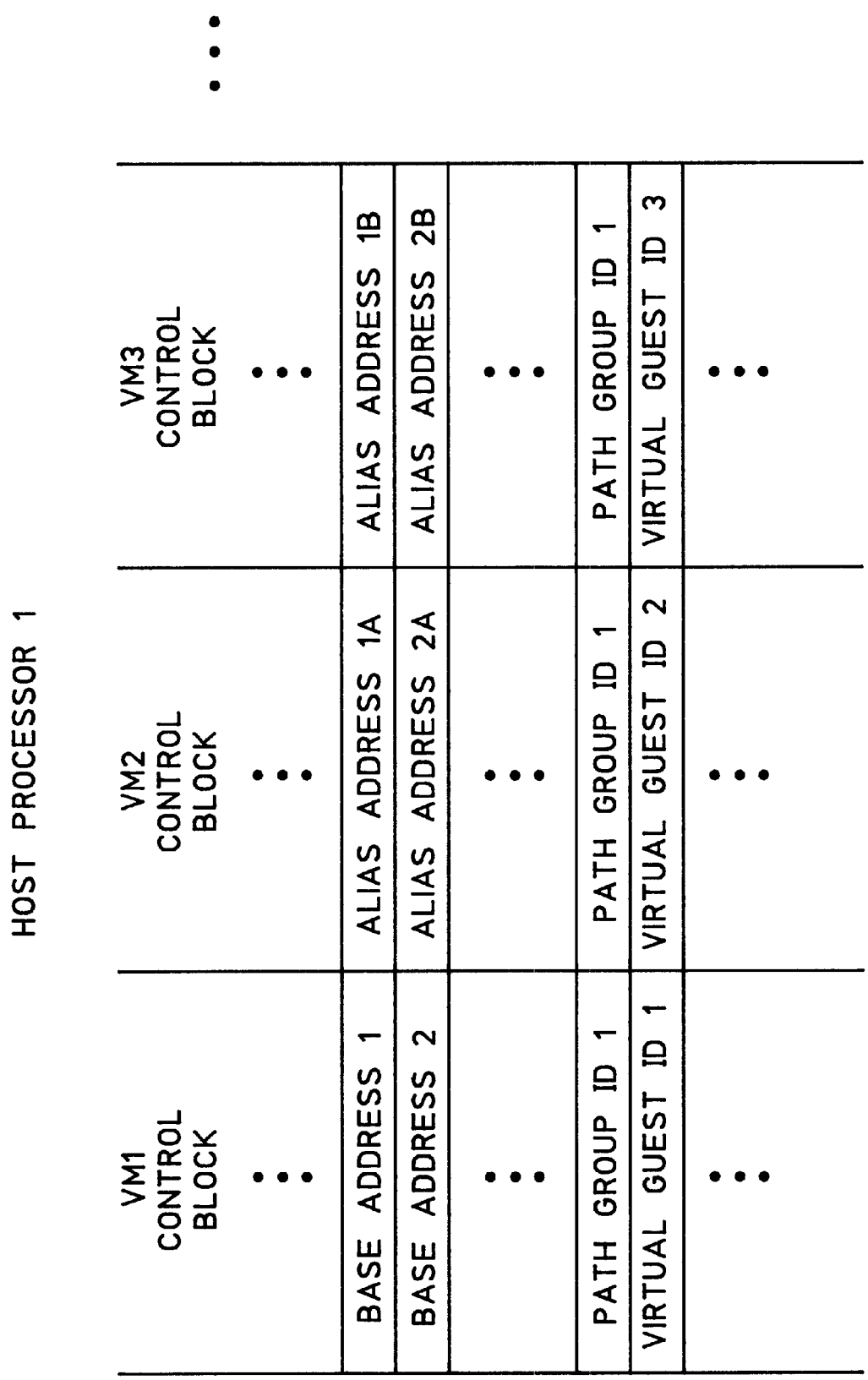
FIG. 6 is an-illustration of control blocks corresponding to the virtual machine guests.

Virtual machine operating system 218 generates and assigns a unique virtual machine ID (VMID) to each of virtual machines 222, 224, and 226 (step 306). The VMID may also be referred to as a logical host ID (LEI). Preferably, each VMID is stored in a respective control block of a guest. FIG. 6 is an illustration of the control blocks of virtual machines 222, 224, and 226 after virtual machine operating system 218 performs the described steps.

The flowchart of FIG. 3 ends at an end block 308, where virtual machine operating system 218 performs steady-state processing. During such processing, overhead and function processing costs in CP are tied to how often SIE is exited for each virtual machine; exits from SIE indicate work for CP. The most common reasons for exiting SIE include I/O processing, page fault resolution, and instruction simulation. Thus, hardware assists play a significant role. Under I/O Assist, I/O interrupts do not cause CP interrupts and thus avoid VM overhead under certain conditions. I/O Assist can avoid exiting to SIE to handle the I/O interrupt processing.

Reference is now made to FIGS. 2 and 4 in combination. A guest operating system is running on one of virtual machines 222, 224, and 226, such as virtual machine 222, and is operating under I/O Assist. Starting at a start block 400 of FIG. 4, the guest operating system sends a storage device access request to storage controller 108 (step 402) for accessing storage device 128. The storage device access request may be a RESERVE request for a DASD or an ASSIGN request for a tape device. Along with the request, the guest operating system sends control block information, which includes conventional information such as the command address, the device address, and the PGID, but which also includes the VMID associated with virtual machine 222 (step 404).

Assuming storage controller 108 grants the guest operating system access to storage device 128, the guest operating system performs device operations (read, write, etc.) on storage device 128 (step 406). During this time, storage controller 108 provides the guest operating system with exclusive access to storage device 128 as will be understood more clearly below. At this point, if one guest operating system is allowed to request access to a storage device while another guest operating system is performing storage device operations, data integrity issues would arise in conventional systems.

When device operations are complete, the guest operating system sends a storage device de access request to storage controller 108 for d[0085] accessing storage device 128 (step 408). The storage device de access request may be a RELEASE request for the DASD or an UNASSIGN request for the tape device. Along with the request, the guest operating system sends control block information, which includes the command address, the device address, the PGID, and the VMID (step 410). Here, storage controller 108 releases storage device 128 of the earlier exclusivity by the guest operating system as will be understood more clearly below. The flowchart ends at an end block 412.

Reference is now made to FIGS. 2 and 5 in combination. At a start block 500, some operating system has exclusive access to storage device 128 previously granted by storage controller 108 (e.g., that access provided in relation to FIG. 4). During such access, storage controller 108 receives a storage device access request from an operating system of a host processor for storage device 128 (step 502). Along with the request, storage controller 108 receives control block information, which includes conventional information such as a command address, a device address, and a PGID, but also includes a VMID (step 504). In this example, the operating system presently accessing storage device 128 is a guest operating system of host processor 112, and the operating system presently requesting access to storage device 128 is another guest operating system of host processor 112 different from the presently accessing guest operating system.

Storage controller 108 compares the PGID associated with the present request and a stored PGID associated with the present accessing of storage device 128 (step 506). If the PGIDs are not the same (step 508), then storage controller 108 denies access of storage device 128 to the operating system (step 510). The PGIDs will not be the same if the request is from a host processor different from the host processor presently accessing storage device 128. In the present example, the operating systems are both guests of host processor 112 and therefore the PGIDs are the same.

If the PGIDs are the same at step 508, then storage controller 108 compares the VMID associated with the present request and a stored VMID associated with the present accessing of storage device 128 (step 514). If the VMIDs are not the same (step 516), then storage controller 108 denies access of storage device 128 to the operating system (step 518). In the present example, the operating systems are different guests of host processor 112 and the VMIDs are different; the requesting guest is denied access. Data integrity is thereby preserved.

If the PGIDs are the same at step 516, then storage controller 520 grants the guest operating system access to storage device (step 520). Therefore, an access request from the same guest having access results in storage controller 108 granting the request. The flowchart ends at an end block 512. The stored PGID and VMID are cleared from memory for any next access request.

Preferably, the VMID is made available at the same location or field as a Host Logical Address (HLA) provided by a host processor in a Logically Partitioned (LPAR) mode. In the LPAR mode, HLAs are used by a channel subsystem of the host processor to differentiate between LPARs. To allow separate LPAR reservations, an ESCON-attached storage controller uses PGIDs since each LPAR has a unique PGID different from all other LPARs. If the processor is not in LPAR mode (the case where shared-dedicated devices applies), the storage controller is able to identify reservations by PGID and a VMID located in the same field as an HLA would be located in an LPAR mode.

It is understood by the inventor and by those skilled in the art that the ordering of steps and functions performed in the flowcharts of FIGS. 3–5 may be modified. As an example, both steps of comparing in FIG. 5 (steps 506 and 514) may be combined in a single comparison step, where storage controller 108 grants access upon a match and denies access otherwise.

It is also understood that device accesses and device access requests may be made by virtual machine systems that support VMIDs and by those that do not support VMIDs. That is, a virtual machine system that supports VMIDs and a virtual machine system that does not support VMIDs will operate properly in the same system. Unsupported operating systems will not send a VMID; nor will a storage controller receive a VMID from such system. However, a storage controller may still compare any available VMID associated with a present storage device access and any available VMID associated with a present storage device access request, and grant or deny requests accordingly.

In overview, a storage device having more than one exposure can have different exposures attached to different VM guests. Prior to attaching an exposure to a guest, a VMID is sent which identifies the preferred virtual guest to the storage device for the purpose of limiting reservations. The guest operating system could then treat the storage device as a shared device and preserve data integrity in a conventional manner (e.g., by using RESERVE/RELEASE for DASD and ASSIGN/UNASSIGN for TAPE). VM allows the guest to use the storage device in I/O Assist, and gain the resultant performance benefits.

In one particular embodiment, a host processor may inform a storage controller of the host support level by issuing a Perform Subsystem Function CCW with a Set System Characteristics order (PSF/SSC). Included in data transferred is a VMID that can be used by the storage controller to determine the scope of a RESERVE CCW. The VMID is valid only for the exposure upon which it was received by the storage controller. By assigning different VMIDs to the different exposures of Parallel Access Volumes (PAV) and attaching the PAV addresses to different preferred guests (i.e., those guests eligible for I/O Assist), a DASD can be shared among those guests without losing the performance benefit of I/O Assist.

Thus, a method of sharing a dedicated device between virtual machine guests may include receiving a first storage device access request associated with a first path group identifier and a first virtual machine identifier; granting the first storage device access request; receiving a second storage device access request during access associated with granting the first storage device access request; determining that the second storage device access request is associated with the first path group identifier but not with the first virtual machine identifier; and denying the second storage device access request in response to determining.

Accordingly, a storage controller is operative to deny a storage device access request from a first virtual machine of a host processor responsive to a compare by the storage controller of a first virtual machine ID of the first virtual machine and a second virtual machine ID of a second virtual machine of the host processor. More specifically, the storage controller may be operative to receive a request for accessing a storage device; operative to compare a stored path group ID and a requesting path group ID associated with the request; operative to compare a stored virtual machine ID and a requesting virtual machine ID associated with the request; and operative to grant or deny the request responsive to the compares.

In addition, a host processor operative for use with a storage controller may be running a virtual machine operating system, a first preferred guest operating system, and a second preferred guest operating system. The virtual machine operating system may be executable to assign a first virtual machine identifier to the first preferred guest operating system and a second virtual machine identifier to the second preferred guest operating system. The first preferred guest operating system may be executable to send, in an I/O Assist mode, the first virtual machine identifier in association with a first storage device access request. The second guest operating system may be executable to send, in an I/O Assist mode, the second virtual machine identifier in association with a second storage device access request, where the first virtual machine identifier is different from the second virtual machine identifier.

Thus, preferred guest operating systems running in a single host processor can share a storage device while both preserving data integrity and performing optimally.

I claim:

1. A method of sharing a dedicated device between virtual machine guests, comprising:
   receiving a first storage device access request associated with a first path group identifier and a first virtual machine identifier;
   granting the first storage device access request;
   receiving a second storage device access request with a second virtual machine identifier during access associated with granting the first storage device access request;

determining that the second storage device access request is associated with the first path group identifier;

comparing the first virtual machine identifier and the second virtual machine identifier associated with the second storage device access request;

determining that the first and the second virtual machine identifiers are different; and denying the second storage device access request in response to determining a difference.

2. A method according to claim 1, wherein receiving a first storage device access request comprises one of receiving a RESERVE request for accessing a direct access storage device (DASD) and receiving an ASSIGN request for accessing a tape device.

3. A method according to claim 1, further comprising:

receiving a first storage device de access request during access associated with granting the first storage device access request;

determining that the first storage device access request is associated with the first path group identifier and the first virtual machine identifier; and granting the first storage device de access request in response to determining.

4. A method according to claim 3, wherein receiving a first storage device de access request comprises one of receiving a RELEASE request for deaccessing a direct access storage device (DASD) and receiving an UNASSIGN request for deaccessing a tape device.

5. A storage controller operative for use with a host processor having virtual machine guests, said storage controller comprising:

said storage controller operative to receive a request for accessing a storage device;

said storage controller operative to compare a stored path group ID and a requesting path group ID associated with the request;

said storage controller operative to determine whether the stored path group ID and the requesting path group ID associated with the request are different;

said storage controller operative to compare a stored virtual machine ID and a requesting virtual machine ID associated with the request;

said storage controller operative to determine whether the stored virtual machine ID and the requesting virtual machine ID associated with the request are different; and said storage controller operative to grant or deny the request responsive to the compares and differences.

6. A storage controller according to claim 5, further comprising:

a storage controller processor; and software of said storage controller processor, said software executable to perform the compares, the grants and denials.

7. A storage controller according to claim 5, further comprising:

the stored path group ID and the stored virtual machine ID being associated with a present storage device access.

8. A storage controller according to claim 5, further comprising:

said storage controller operative to deny the request responsive to the stored virtual machine ID being different from the requested virtual machine ID.

9. A storage controller according to claim 5, further comprising:

said storage controller operative to grant the request responsive to both the stored path group ID being substantially the same as the requesting path group ID, and the stored virtual machine ID being substantially the same as the requesting virtual machine ID;

said storage controller operative to deny the request responsive to the stored path group ID being different from the requesting path group ID; and said storage controller operative to deny the request response to the stored virtual machine ID being different from the requesting virtual machine ID.

10. A storage controller according to claim 5, wherein said storage controller is operative to receive requests comprising one of RESERVE requests for a direct access storage device (DASD) and ASSIGN requests for a tape device.

11. A method of monitoring access to a storage device for a plurality of preferred virtual guests in a computer system, the computer system including a plurality of host processors and a storage controller, each host processor coupled to the storage controller through a plurality of channels associated with a unique path group ID, the plurality of host processors including a first host processor having a control program and the plurality of preferred virtual guests, the storage controller providing multiple exposures for the storage device, the method comprising:

assigning, by the control program, a first virtual machine ID to a first preferred virtual guest;

assigning, by the control program, a second virtual machine ID to a second preferred virtual guest;

sending, from the first preferred virtual guest to the storage controller, a first request to access the storage device, the first request associated with a first path group ID and the first virtual machine ID;

receiving, at the storage controller, the first request associated with the first path group ID and the first virtual machine ID;

granting, by the storage controller, the first preferred virtual guest access to the storage device;

accessing the storage device by the first preferred virtual guest;

sending, from the second preferred virtual guest to the storage controller, a second request to access the storage device, the second request associated with a second path group ID and the second virtual machine ID;

receiving, at the storage controller, the second request associated with the second path group ID and the second virtual machine ID;

comparing the first and the second path group IDs and the first and the second virtual machine IDs;

determining a mismatch from comparing; and in response to the determining, denying, by the storage controller, the second preferred virtual guest access to the storage device during the accessing by the first preferred virtual guest.

12. A method according to claim 11, wherein sending the first request comprises sending one of a RESERVE request to access a storage device comprising a direct access storage device (DASD) and an ASSIGN request to access a storage device comprising a tape device.

13. A computer system, comprising:

a first host processor, including:

a control program, said control program executable to assign a first virtual machine identifier to a first preferred virtual guest and a second virtual machine identifier to a second preferred virtual guest;

a storage controller, including:
: said storage controller operative to communicate with said first host processor through a first plurality of channels;
: said storage controller operative to allow a storage device to be accessed at multiple exposures;
: said storage controller operative to receive requests to access the storage device by said first and said second preferred virtual guests;
: said storage controller operative to compare the first and the second virtual machine identifiers; and
: said storage controller operative to deny requests to access said storage device by one of said first and said second preferred virtual guests during access by another of said first and said second preferred virtual guests responsive to the compare of the first and the second virtual machine identifiers.

14. A computer system according to claim 13, further comprising:
: a second host processor;
: said storage controller further including:
:: said storage controller operative to communicate with said second host processor over a second plurality of channels different from the first plurality of channels;
:: said storage controller operative to compare a first path group identifier associated with said first host processor and a second path group identifier associated with said second host processor; and
:: said storage controller operative to deny requests from one of said first and said second host processors during access by another of said first and said second host processors responsive to the compare of the first and the second path group identifiers.

15. A computer system according to claim 13, further comprising:
: said storage controller operative to deny requests responsive to the first virtual machine identifier being different from the second virtual machine identifier.

16. A computer system according to claim 14, further comprising:
: said storage controller operative to grant requests responsive to both the first path group ID being substantially the same as the second path group ID and the first virtual machine ID being substantially the same as the second virtual machine ID;
: said storage controller operative to deny a request responsive to the first path group ID being different from the second path group ID; and
: said storage controller operative to deny requests responsive to the first virtual machine ID being different from the second virtual machine ID.

17. A computer system according to claim 13, further comprising:
: said storage controller operative to receive requests comprising at least one of a RESERVE request to access a direct access storage device (DASD) and an ASSIGN request to access a tape device.

18. A computer system according to claim 13, further comprising:
: said control program executable to assign a first storage device exposure to said first preferred virtual guest and a second storage device exposure to a second preferred virtual guest.

19. A host processor operative for use with a storage controller, said host processor comprising:
: a virtual machine operating system;
: a first preferred guest operating system;
: a second preferred guest operating system;
: said virtual machine operating system executable to assign a first virtual machine identifier to said first preferred guest operating system and a second virtual machine identifier to said second preferred guest operating system;
: said first preferred guest operating system to send, in an I/O Assist mode, the first virtual machine identifier and a first path group identifier in association with a first storage device access request;
: said second preferred guest operating system to send, in an I/O Assist mode, the second virtual machine identifier and the first path group identifier in association with a second storage device access request; and
: the first virtual machine identifier being different from the second virtual machine identifier.

20. A host processor according to claim 19, further comprising:
: said first preferred guest operating system to send, in the I/O Assist mode, a first path group identifier in association with the first storage device access request; and
: said second guest operating system to send, in the I/O Assist mode, the first path group identifier in association with the second storage device access request.

21. A host processor according to claim 19, further comprising:
: said first preferred guest operating system to send, in the I/O Assist mode, a first storage device address in association with the first storage device access request;
: said second guest operating system to send, in the I/O Assist mode, a second storage device address in association with the second storage device access request; and
: the first storage device address being different from the second storage device address.

* * * * *